United States Patent Office 2,825,594
Patented Mar. 4, 1958

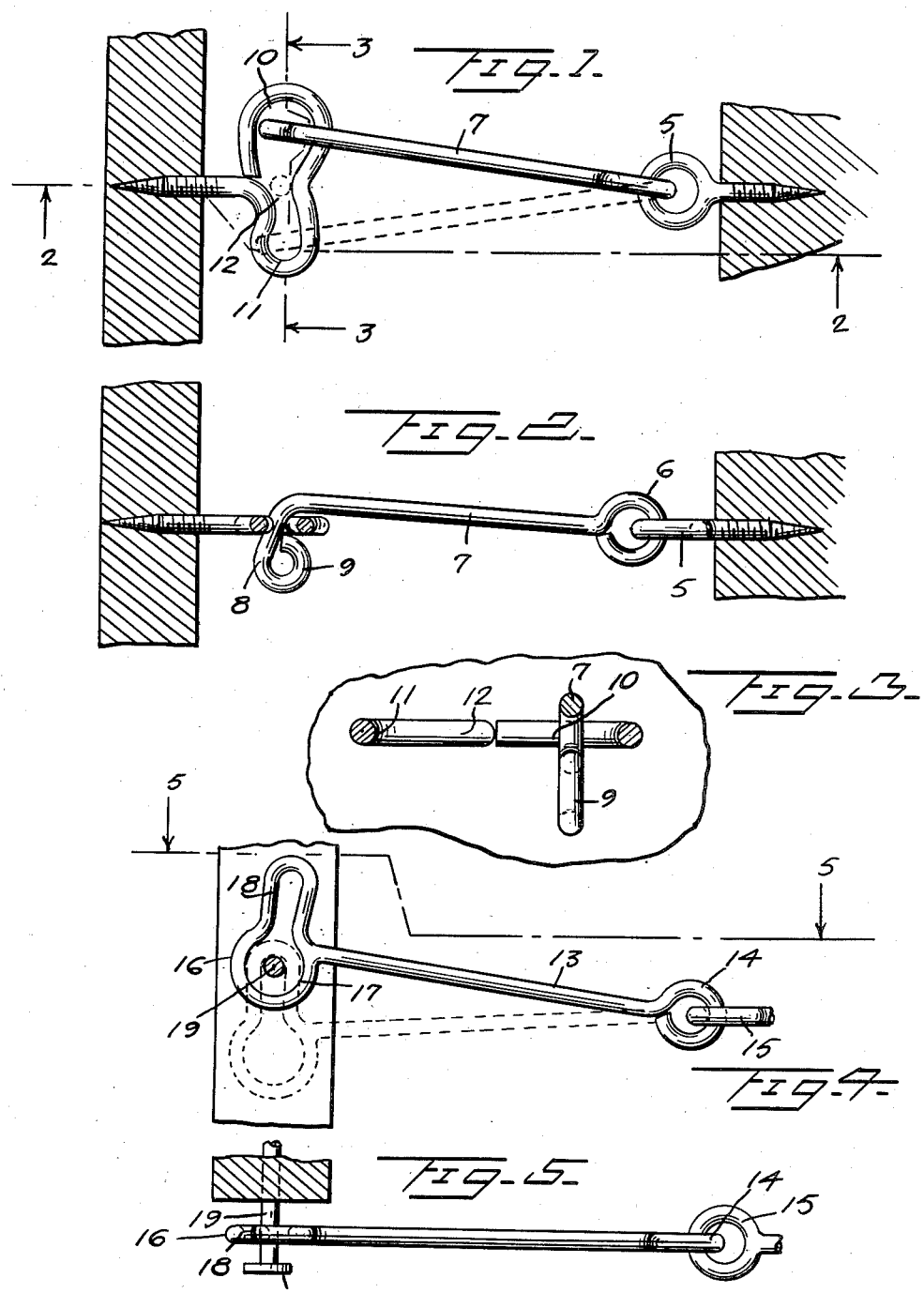

2,825,594

HOOK AND EYE FASTENER

Andrew H. Hatchette, Sr., Cleveland, Ohio

Application December 6, 1956, Serial No. 626,761

1 Claim. (Cl. 292—95)

This invention relates to fasteners of the hook and eye type, the primary object of the invention being to provide a fastener of the hook and eye type which is so constructed and arranged that the hook may be moved laterally within its keeper in one direction, and secured against displacement by unauthorized person operating from a point outside of the window, door or closure with which the latch is used.

An important object of the invention is to provide a keeper of this character in the form of a screw eye constructed to provide a large opening and a substantially small hook keeper opening communicating with the large opening so that the hook may be readily moved laterally from the large opening into the small keeper opening or vice versa, to either lock or unlock the hook, as the case may be.

Another object of the invention is to provide a keeper that receives the hook end of the device wherein the large and small openings or eyes thereof communicate through a contracted passageway, so that the hook will be held against accidental displacement within the small opening, and can be moved from the small opening to a position within the large opening to disconnect the hook from its keeper, only by applying force to move the hook in one direction past the contracted portion of the keeper.

A further object of the invention is to provide a hook having a transversely elongated eye member formed on the free end thereof for positioning over a headed keeper such as a nail or screw, thereby providing an exceptionally cheap and effective fastener.

Other and further objects and advantages of the invention will be hereinafter described and the novel features thereof defined in the appended claim.

Referring to the drawing:

Fig. 1 is a plan view of a fastener constructed in accordance with the invention, illustrating the position of the hook of the fastener as positioned in the large opening of the keeper preparatory to passing into the small or keeper opening of the device.

Fig. 2 is a sectional view taken on line 2—2 of Fig. 1.

Fig. 3 is a sectional view taken on line 3—3 of Fig. 1.

Fig. 4 is a plan view of a modified form of the invention.

Fig. 5 is a sectional view taken on line 5—5 of Fig. 4, the edge of the hook and keeper being shown in elevation.

Referring to the drawing in detail, the reference character 5 indicates a screw eye with which the eye 6 of the shank 7 of the fastener interlocks, in pivotally connecting the shank to the screw eye 5.

As better shown by Fig. 2 of the drawing, a hook 8 is formed at the free end of the shank 7 and has its extremity curved upwardly and forwardly as at 9 forming an enlargement of a diameter greater than the diameter of the keeper opening of the keeper proper.

The keeper is also in the form of a screw eye which is elongated transversely, to provide a substantially large opening 10 and a small or keeper opening 11, the openings 10 and 11 communicating through the narrow passageway 12, the side edges of which are so arranged with respect to each other that they will grip the hook as the hook moves therebetween, with the result that when the hook enters the small or keeper opening 11, it is held therein by the contracted portion of the passageway and may only be moved into the large opening 10 by directing force on the shank 7 in one direction, to cause a portion of the keeper to flex laterally and allow the hook to pass therebetween.

In the form of the invention as shown by Figs. 4 and 5 of the drawing, the shank of the fastener which is indicated by the reference character 13 has its eye 14 interlocked with the screw eye 15 whereby the shank 13 is secured to a movable element such as a door, window or similar closure.

At the free end of the shank is a horizontal eye member 16 which constitutes the keeper for the fastener, the eye member 16 being elongated transversely as better shown by Fig. 4 of the drawing.

In the formation of the horizontal eye member, it will be seen that a substantially large opening 17 is provided at one end thereof, while at the other end of the horizontal eye member a small opening 18 is provided, the small opening constituting the keeper opening of the keeper proper. The reference character 19 indicates a stationary headed pin which is driven into the stationary portion of the door or window frame with which the fastener is used. The head of the pin, which is indicated by the reference character 20 is of a diameter to permit it to pass into the substantially large opening 17, but prevent the fastener from becoming disconnected from the pin 19, when the pin 19 is located within the small opening 18 as when the latch or shank 13 is moved from the position shown in full lines in Fig. 4, to the position shown in dotted lines.

In this form of the invention the horizontal eye member 16 is positioned over the head 20, the head passing through the enlarged opening 17 of the eye member. The shank 13 is now swung laterally whereupon the pin is held within the keeper opening 18 and can only be released by moving the fastener or shank from the position as shown in dotted lines in Fig. 4 of the drawing to the position shown in full lines.

With the pin 19 in this position, it is obvious that the shank 13 may now be lifted and disconnected from the pin allowing the closure or door with which the fastener is connected, to move to either its open or closed position as desired.

From the foregoing it is believed that the structure and operation of the fastener may be readily determined, and that a further description of the latch and its operation is believed unnecessary.

Having thus described the invention, what is claimed is:

A fastener comprising a pivoted shank, a depending hook formed at one end of the pivoted shank, said hook terminating in an enlargement, a keeper comprising a length of flexible material constructed to provide an expansible elongated member having a large opening, and a small hook retaining opening communicating through a contracted passageway of a width less than the diameter of said enlarged hook restricting movement of said hook from said small opening of the eye member to the large opening normally securing the hook in a locking position within said small opening.

References Cited in the file of this patent

UNITED STATES PATENTS

| 257,986 | Skerrett | May 16, 1882 |
| 1,088,392 | Altman | Feb. 24, 1914 |
| 2,212,771 | Giardina | Aug. 27, 1940 |

FOREIGN PATENTS

| 18,108 | Norway | Sept. 7, 1908 |
| 328,498 | Great Britain | Mar. 18, 1930 |